United States Patent
Clark

[19]

[11] Patent Number: 6,083,295
[45] Date of Patent: Jul. 4, 2000

[54] METHOD OF PROCESSING FINELY DIVIDED MATERIAL INCORPORATING METAL BASED CONSTITUENTS

[75] Inventor: Allan Douglas Clark, Carmarthenshire, United Kingdom

[73] Assignee: Arc Dust Processing (UK) Limited, Gwent, United Kingdom

[21] Appl. No.: 09/068,413
[22] PCT Filed: Nov. 12, 1996
[86] PCT No.: PCT/GB96/02785
  § 371 Date: Jul. 16, 1998
  § 102(e) Date: Jul. 16, 1998
[87] PCT Pub. No.: WO97/18338
  PCT Pub. Date: May 22, 1997

[30] Foreign Application Priority Data

Nov. 14, 1995 [GB] United Kingdom .................... 9523229

[51] Int. Cl.$^7$ ............................ C21B 11/06; C22B 19/00
[52] U.S. Cl. ............................ 75/479; 75/480; 423/108
[58] Field of Search ........................ 75/479, 480; 423/108

[56] References Cited

U.S. PATENT DOCUMENTS

| | | |
|---|---|---|
| 959,924 | 5/1910 | Dedolph . |
| 3,849,112 | 11/1974 | Gupta ............................................. 75/3 |
| 4,529,439 | 7/1985 | Barber .......................................... 75/10 |
| 4,643,110 | 2/1987 | Lisowyj et al. . |
| 4,673,431 | 6/1987 | Bricmont . |
| 4,678,647 | 7/1987 | Lisowyj et al. . |
| 4,983,214 | 1/1991 | Bottinelli et al. ......................... 75/387 |

FOREIGN PATENT DOCUMENTS

| | | |
|---|---|---|
| 0275863 | 7/1988 | European Pat. Off. . |
| 0387479 | 9/1990 | European Pat. Off. . |
| 0508166 | 10/1992 | European Pat. Off. . |
| 1076156 | 2/1960 | Germany . |
| 1422232 | 1/1976 | United Kingdom . |
| 93/19213 | 9/1993 | WIPO . |

OTHER PUBLICATIONS

Patent Abstract of Japan, vol. 012, No. 365 (C–532), Sep. 29, 1988 & JP 63 117911 A (Yasuhiro Inazaki), May 21, 1988 (to follow).

Patent Abstract of Japan, vol. 004, No. 098 (C–018), Jul. 15, 1980 & JP 55 062127 A (Nippon Kokan KK: Others; 01), May 10, 1980.

*Primary Examiner*—George Wyszomierski
*Assistant Examiner*—Janelle Combs Morillo
*Attorney, Agent, or Firm*—Davis and Bujold

[57] ABSTRACT

Finely divided material, such as flue dust from a steel making furnace, is processed to reclaim constituents. The material in hopper (11) is pelletized. The pellets are dried in a dryer (16) and fed to a first rotary kiln (21) where they are sintered to provide very hard pellets, during which process volatile constituents are driven off and collected. The sintered pellets are screened to remove finely divided material and fed with reductant, such as finely divided washed anthracite (35), to a second rotary kiln (31). Reduction of the pellets causes a second constituent to be driven off and the second constituent is then oxidized in the kiln and collected as finely divided oxide. The original pellets retain their integrity and become essentially sponge iron.

14 Claims, 1 Drawing Sheet

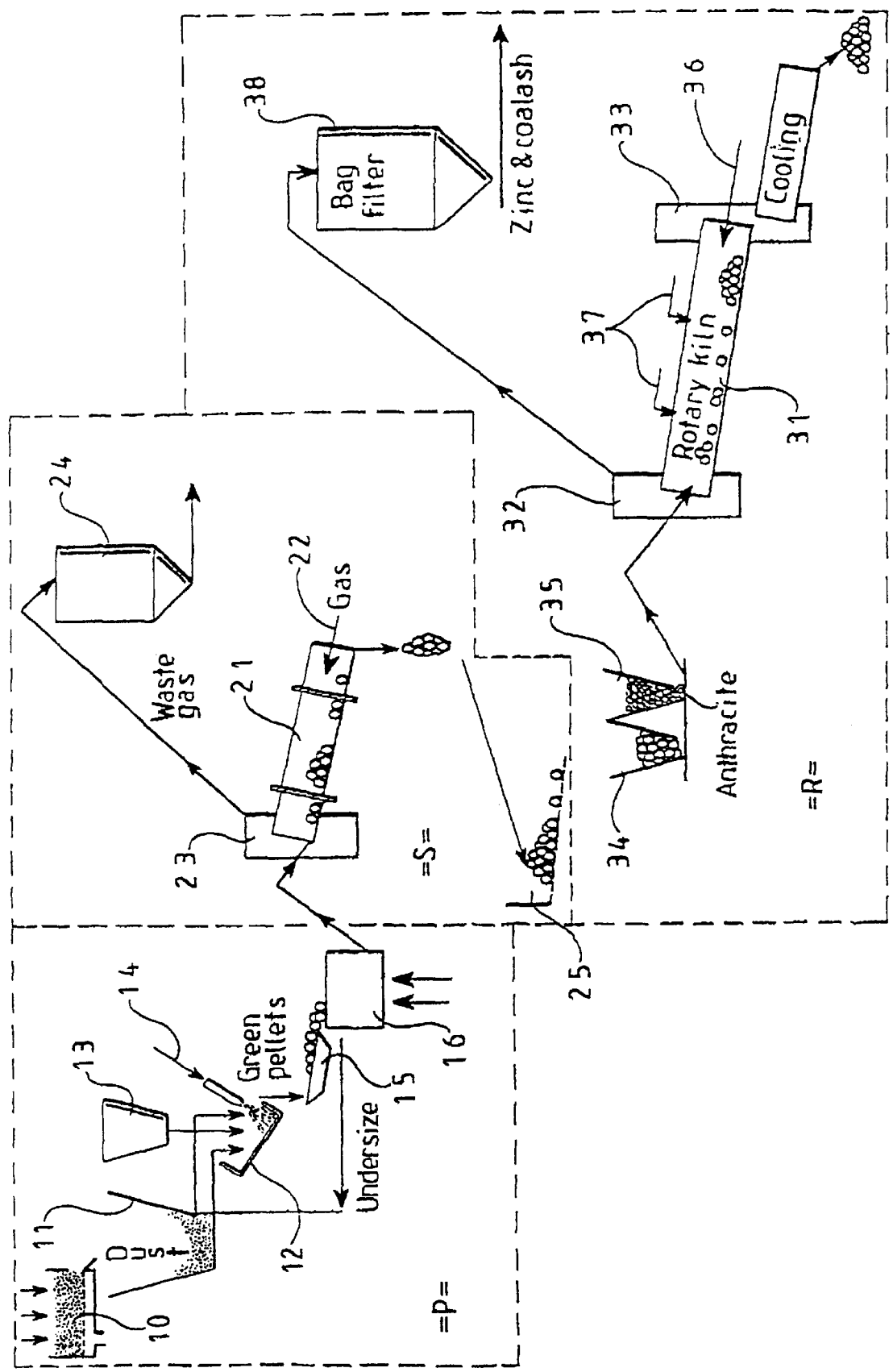

METHOD OF PROCESSING FINELY DIVIDED MATERIAL INCORPORATING METAL BASED CONSTITUENTS

The invention relates to a method of processing finely divided materials incorporating a range of metal based constituents. The invention is applicable particularly but not exclusively to processing flue dust generated by steel making in an electric arc furnace.

BACKGROUND OF THE INVENTION

In a typical electric arc furnace or other steel making furnace, several thousand tonnes of flue dust are generated each year. The constitution of the flue dust varies with the feed material to the furnace which normally consists of or includes a wide range of scrap metal including old motor cars. The flue dust may contain about 40% of non-ferrous metallic compounds, about 50% ferrous compounds (mainly oxide) with the remainder being gangue material. The non-ferrous metallic constituents are normally predominantly lead oxide and zinc oxide but typically include some zinc chloride, copper chloride, cadmium chloride, potassium chloride, sodium chloride and cadmium oxide. Oxides of potassium and sodium may also be present. Flue dust from a basic oxygen furnace normally contains a higher proportion of ferrous compounds but there are still significant proportions of non-ferrous material.

Historically, flue dust has been dumped but this involves a substantial cash expenditure and is becoming environmentally less acceptable due to the toxicity of many of the constituents. The invention is concerned particularly with a process for reclaiming constituents from a material such as flue dust. The invention may be looked on primarily as a means for avoiding disposal of contaminants or as a means of extracting valuable non-ferrous metals or as a means of recuperating iron for re-use in the steel making process. The dominant objective depends on the circumstances.

It is already known from EP 275863A to mix flue dust with solid carbonaceous material and an organic binder, pelletize this mixture and heat the pellets. Some constituents are driven off while iron and lead are reduced to the metallic form and poured off as liquid metal. It is stated that the lead can be separated from the iron gravitationally but some lead must remain in solution in the iron. Also, very high temperatures have to be used to achieve the molten state for the iron and extracting the metal in molten form requires a facility such as tilting a rotary kiln and is not convenient for continuous operation.

SUMMARY OF THE INVENTION

An object of the invention is to provide a method of processing flue dust or other finely divided material to separate constituents therefrom in a more practical manner.

The invention is concerned with a method of processing finely divided material incorporating a range of metal based constituents, the method comprising: pelletizing the material; drying the pellets, sintering the pellets at a temperature and residence time to produce very strong pellets at which temperature volatile first constituents are driven off from the pellets; and heating the pellets in the presence of a reductant whereby one or more second constituents are reduced to a volatile form and driven off leaving one or more reduced third constituents. The method is characterised in that finely divided material which would tend to fuse the pellets is excluded from the reduction phase whereby the pellets retain their integrity at the temperatures employed for reduction.

Avoidance of finely divided material permits a sufficiently high temperature to be selected for effective reduction without fusing the pellets together. This in turn leads to convenient handling of the material and a long life for the plant in which the method is operated.

Preferably the reduction and also the sintering take place in rotary kilns.

The pellets may be screened between the sintering and reduction stages for removal of finely divided material.

If a solid reductant such as anthracite is used, it is important to avoid finely divided reductant, for example by using washed anthracite.

The invention may be applied to flue dust from a steel making furnace in which case the principal or substantially sole third constituent would ordinarily be iron. This iron takes on the form of sponge iron which is convenient to handle and convenient for refeeding to the furnace.

In a typical case, the volatile constituents driven off during sintering, namely the first constituents, are various metal oxides and chlorides. Lead oxide and lead chloride may be the major constituent. In general zinc oxide remains in the pellets.

During the reduction stage, zinc oxide is reduced to the metallic form and is driven off where it again oxidises and can be collected as zinc oxide dust. The material collected can comprise about 90% zinc oxide with much of the remainder being coal ash. The zinc oxide can be a commercially useful product at this level of purity without any further treatment.

BRIEF DESCRIPTION OF THE DRAWING

An embodiment of the invention is described with reference to the accompanying drawing which is a diagrammatic representation of plant for carrying out the invention.

DESCRIPTION OF THE PREFERRED EMBODIMENT

The invention has been operated successfully on a pilot plant basis away from a steel works and the drawing is based on a simple adaptation of the pilot plant for use at a steel works. A production plant may be more sophisticated than the plant shown. Essentially, the plant comprises three sections, namely a pelletizing stage P, a sintering stage S and a reducing stage R.

Dust from an electric arc steel making furnace is collected in a hopper 11 from which it is supplied to a rotary pelletizing pan 12 along with a supply of binder 13 and water 14. Bentonite is a suitable binder and 4% by weight of the mixed material is a suitable proportion of bentonite. The resulting green pellets are fed to a screen 15 which separates under sized pellets for return to the pelletizer and selects larger pellets of about 10–15 mm diameter for further processing. A limited range of pellet size may be important to provide a degree of uniformity to subsequent treatment of the pelletized material. Optionally a prewash for the flue dust may be carried out in a wash unit 10. The need or desirability for a prewash is discussed below.

The green pellets are then dried in a drier 16, typically using warm air at about 300–400° C., this air having been heated from waste heat in other parts of the plant.

The sintering stage S consists essentially of a rotary kiln 21 with its axis at about one degree or a few degrees to the horizontal so that during rotation pellets fed in at the higher, input end gradually work down through the kiln to the lower, output end. The kiln is fired by gas at its output end through a central burner 22. Any other fuel could be employed instead of gas. Excess air is provided to the kiln so that its atmosphere tends to be oxidising rather than reducing. The maximum temperature achieved in the kiln should be about 1050–1200° C. A waste gas hood 23 is shown at the input end of the kiln but there may also be a similar waste gas hood at the output end.

Dried pellets, preferably still at elevated temperature to save energy and reduce thermal shock are fed to the input end of kiln 21. Their temperature rises as they pass through the kiln. This heating sinters the pellets and makes them very strong with a high resistance to degradation as required in the next stage of the process. Strength can be measured by way of a standard ASTM tumble test for blast furnace pellets which requires 95% of pellets to remain intact after the standard test. By comparison 98% of the pellets hardened in the pilot plant remained intact in this standard test. The minimum requirement for blast furnace pellets is probably a realistic minimum for use with the invention. However the essential requirement is for the pellets to retain their integrity in the rest of the process as discussed below. The sintering takes place in an oxidising atmosphere. As the pellets are heated, those constituents within the original dust which are volatile at temperatures of 1050–1200° C. are driven off. In general the process is physical evaporation but some materials could be driven off in the metallic form and oxidised in the atmosphere within the kiln.

These materials, forming the first constituents of the pellets, are carried by the waste gases to a scrubber or bag filter for collection and for cleaning the waste gas for release to atmosphere. The first constituents may be sold on for subsequent extraction of valuable materials or may be separated into valuable materials in additional parts of the plant not shown, using conventional techniques.

With the dust used in the pilot plant, lead oxide and chloride accounted for 50% of the material driven off from the pellets in the sintering stage. Other volatile materials present in significant quantities in the first constituents are halides, oxides and sulphates of cadmium, copper, calcium, potassium, sodium and zinc. There may also be small quantities of potassium oxide and sodium oxide. Zinc oxide is also an important material in the flue dust but in general this is not volatile and remains in the pellets. Small amounts of zinc oxide may be collected with the waste gases from the sintering stage, presumably due to the presence of small amounts of zinc in a volatile form.

The presence of significant quantities of chlorides in the original flue dust can lead to a requirement for special measures to inhibit formation and escape of dioxins. Typical metal chlorides present in flue dust, including lead chloride are soluble, allowing the chloride to be washed out of the material at an early stage. One example of flue dust was found to contain 2.1% chlorine before washing but only 0.1% chlorine after washing. Washed material can be pressed to remove most of the water and then has a suitable water content for pelletization.

To remove all or most of the volatile metallic compounds under consideration, the pellets should be maintained at a temperature at or near 1100° C. for several hours. Other temperatures in between 900 and 1200° C. may be acceptable in some situations. The length and inclination of the kiln, its rotating speed and the temperature gradient along the kiln should be adjusted to achieve the result of driving off all significant quantities of volatile materials.

In addition to the sintered pellets leaving the kiln 21, there is other material which may have been removed from the pellets by abrasion or crushing. This loose material is separated from the pellets in a screen 25 to complete the activity at the sintering stage S.

The reduction stage R is based on a further inclined rotary kiln 31 having waste gas collection hoods 32 and 33 at both ends. Sintered pellets from a hopper 34, anthracite from a hopper 35 and also some Dolomite fines are fed to the input (upper) end of the kiln in a proportion of about 2 parts by weight of pellets to one part by weight of anthracite. Anthracite is a suitable low cost reductant which can be handled conveniently along with the pellets and is also generally available and in regular use for other purposes in steel making. Anthracite or other coal with a high ash fusion temperature should be selected for a reason explained below. It is important to avoid finely divided reductant. If anthracite is used, it should have been washed to remove fines. Other reductants including chopped scrapped car tires or bituminous coal may be used instead. The significant zinc oxide content of car tires would be a further source of reclaimed zinc and the relatively high phosphorous content of car tires would not be an embarrassment. A still further alternative for the reductant would be natural gas fed through the burden where it tends to be partially oxidised to carbon monoxide and then combusted with air to provide the required heat. Dolomite should be present in sufficient quantity to adsorb any sulphur. The dolomite fines are not in sufficient quantity to provide the problems referred to below which can be associated with fines from anthracite or pellets.

The pellets at the beginning of the reduction stage are essentially sintered iron oxide with a significant zinc oxide content and other gangue material. In the interests of energy conservation, it is preferable to feed the pellets into reduction kiln 31 while they are still at elevated temperature from the sintering process but some reduction in temperature or even temperature reduction to ambient may be necessary for convenient screening and handling of the pellets and if storage time is needed to match the throughput of the sintering stage and the reduction stage.

The kiln 31 is typically brought up to temperature by a gas or oil burner 36 but once the plant is up to temperature, most or all of the required heat is provided by combustion of reductant during the reduction process. Instead of or in addition to gas or oil, finely divided anthracite or bituminous coal carried in a stream of air may be used to raise the kiln temperature and help to maintain it at its elevated level. Such finely divided solid fuel should be combusted immediately in its air stream to avoid build up of any such solid material in the burden. About 15% of the reductant may be provided in this way. This reductant also should be selected to form ash with a high fusion temperature.

In addition to air introduced with the gas or finely divided anthracite for combustion, additional air is likely to be needed along the length of the kiln for combustion of the anthracite. This is provided for example by tuyeres 37 spaced out along the length of the kiln.

The burden in the kiln is raised to a temperature of about 1100° C. 1080° C. may be ideal. Temperatures between 900 and 1150° C. may be acceptable in some circumstances. The zinc oxide in the pellets (forming a second constituent in the original pellets) is reduced to the metal which is volatile at the temperature within the kiln. The atmosphere within the kiln is kept sufficiently oxidising for the metallic zinc to again oxidise. It is then carried away with waste gases through hoods 32 and 33 and is separated from the waste gases in a bag filter 38. The zinc oxide has a high degree of purity and the solid product collected in the bag filter may be approximately 90% zinc oxide and 10% coal ash. The zinc oxide with coal ash may then be sold on as a commercially useful product or the coal ash may be separated, for example by a flotation process, to produce a purer form of zinc oxide. Any other contaminants within the zinc oxide are unlikely to be present in significant quantities. To complete the reduction process, a residence time of several hours is required. The lengths and inclination of the kiln, its rotating speed and temperature gradient are set to achieve the required reduction.

The iron oxide, being a third constituent for recovery, which originally formed the major part of the pellets, is also reduced to the metallic form as sponge iron which remains in the pellets. The retention of individual pellets of sponge iron after the reduction stage is very important. If pellets begin to fuse together, they may also tend to fuse to the surface of the kiln. Once such fusion commences, there is a tendency for large numbers of pellets to fuse together and very quickly form into a molten or semi-molten mass. If this occurs, the life of the plant used for the process becomes very short and the iron produced is very difficult to handle. The temperature necessary for effective reduction is such that fusion is likely to occur unless special precautions are taken. Finely divided material, particularly material such as may arise in the pellets in the sintering stage, has a greater propensity to fusion than the pellets themselves and also has a propensity to fuse pellets together. Thus the avoidance of any such finely divided material is critical. Avoidance of finely divided reductant is also important but not necessarily fundamental. Of course, high fusion temperature ash formed by oxidation of the reductant is not the kind of material which has a serious propensity to fusion of the burden at the temperatures under consideration.

The process is in many cases carried out intermittently because the capacity of the plant is unlikely to be matched by the production of flue dust from a steel making plant. Maintenance of discrete pellets as opposed to a molten mass of iron becomes even more important if the plant is to be shut down and restarted at regular intervals.

The pellets leaving the output end of the kiln along with a char are cooled in a non-oxidising atmosphere to prevent re-oxidation on exposure to the atmosphere. The pellets can then be separated magnetically from the char. The resulting pellets are about 60% to 70% iron with manganese, silica, calcium and magnesia the only other significant materials. Manganese and silica are both required in significant quantities in steel making so the pellets of sponge iron can be fed back to the electric arc furnace.

In a typical case, the flue dust from an electric arc furnace is about 1.5% of the weight of steel produced in the furnace. From this 1.5%, about 0.75% (i.e. one half) is converted to sponge iron.

As a typical guide to what can be reclaimed from the flue dust, 1 Kg of flue dust is likely to yield approximately the following quantities of other materials: sponge iron (including about 30% impurities) 500 gms; lead compounds 50 gms; zinc oxide 300 gms; other useful metal oxides and chlorides 10 gms; inert char and ash for disposal 150 gms.

Use of the invention has environmental gains by avoiding burial or similar disposal of toxic material, by avoiding the need to use virgin sources of lead and zinc and by recycling additional iron to the steel works.

Although the primary use of the invention is seen as the processing of electric arc furnace dust or dust from other steel making furnaces, the invention may be used to process other forms of waste material.

It is envisaged that plant of the kind described above would normally be situated at the site of a steel making furnace and integrated into the steel making plant as an integral part of it. However, a single plant of the kind described above could be positioned strategically for servicing a number of steel plants. Also, it is not essential that the whole process is carried out at a single plant. For example, dust could be pelletized and dried at a steel plant and then transported to another site where the sintering and reduction stages are carried out.

What is claimed is:

1. A method of processing finely divided material incorporating a range of metal based constituents, the method comprising the steps of:

forming the finely divided material into pellets;

drying the pellets;

heating the pellets in a first rotary kiln at a temperature and residence time sufficient to sinter the pellets and to drive off volatile first constituents from the pellets;

removing any material in a finely divided form from the sintered pellets; and heating the sintered pellets in a second rotary kiln, in a reducing atmosphere, whereby one or more second constituents are reduced to a volatile form and driven off, leaving one or more reduced third constituents.

2. A process as claimed in claim 1, wherein the reduction takes place in a rotary kiln.

3. A method as claimed in claim 1, wherein the sintered pellets are screened between the sintering and the reduction to remove finely divided material.

4. A process as claimed in claim 1, wherein the second constituent is predominantly zinc oxide.

5. A process as claimed in claim 4 wherein the zinc oxide becomes reduced to zinc which reoxidizes to form zinc oxide, which is driven off with waste gases and is then collected from the waste gases.

6. A process as claimed in claim 1, wherein the first constituents incorporate a substantial quantity of lead oxide.

7. A process as claimed in claim 1, wherein the finely divided material is flue dust from a steel making furnace.

8. A process as claimed in claim 7, wherein the flue dust is prewashed in water to remove soluble constituents before pelletizing.

9. A process as claimed in claim 1, wherein the sintered pellets are heated in the second rotary kiln in the presence of coal functioning as a reductant.

10. The method as claimed in claim 9, wherein the sintered pellets are heated in the second rotary kiln in the presence of anthracite functioning as a reductant.

11. A process as claimed in claim 1, wherein the pellets are sintered at a temperature of between 900° C. and 1200° C.

12. A process as claimed in claim 1, wherein the pellets are reduced at a temperature of between 900° C. and 1200° C.

13. A process as claimed in claim 1, wherein the third constituent is predominantly iron and the pellets become predominantly sponge iron.

14. A method of processing finely divided material incorporating metal based constituents, the method comprising the steps of:

forming the finely divided material into a plurality of pellets;

drying the plurality of pellets;

heating the plurality pellets in a continuous motion first rotary kiln, to provide continuous rolling motion of the plurality of pellets, at a temperature and for a residence time which is sufficient to sinter the plurality pellets and drive off substantially all of volatile first constituents from the plurality of pellets;

removing any finely divided material from the sintered plurality of pellets; and heating the sintered plurality of pellets in a continuous motion separate second rotary kiln, in a reducing atmosphere which provides continuous rolling motion of the plurality of pellets, to reduce at least one second constituent to a volatile form and driven off the at least one second constituent from the sintered plurality of pellets thereby leaving at least one reduced third constituent in the second separate rotary kiln.

* * * * *